United States Patent Office 3,108,350
Patented Oct. 29, 1963

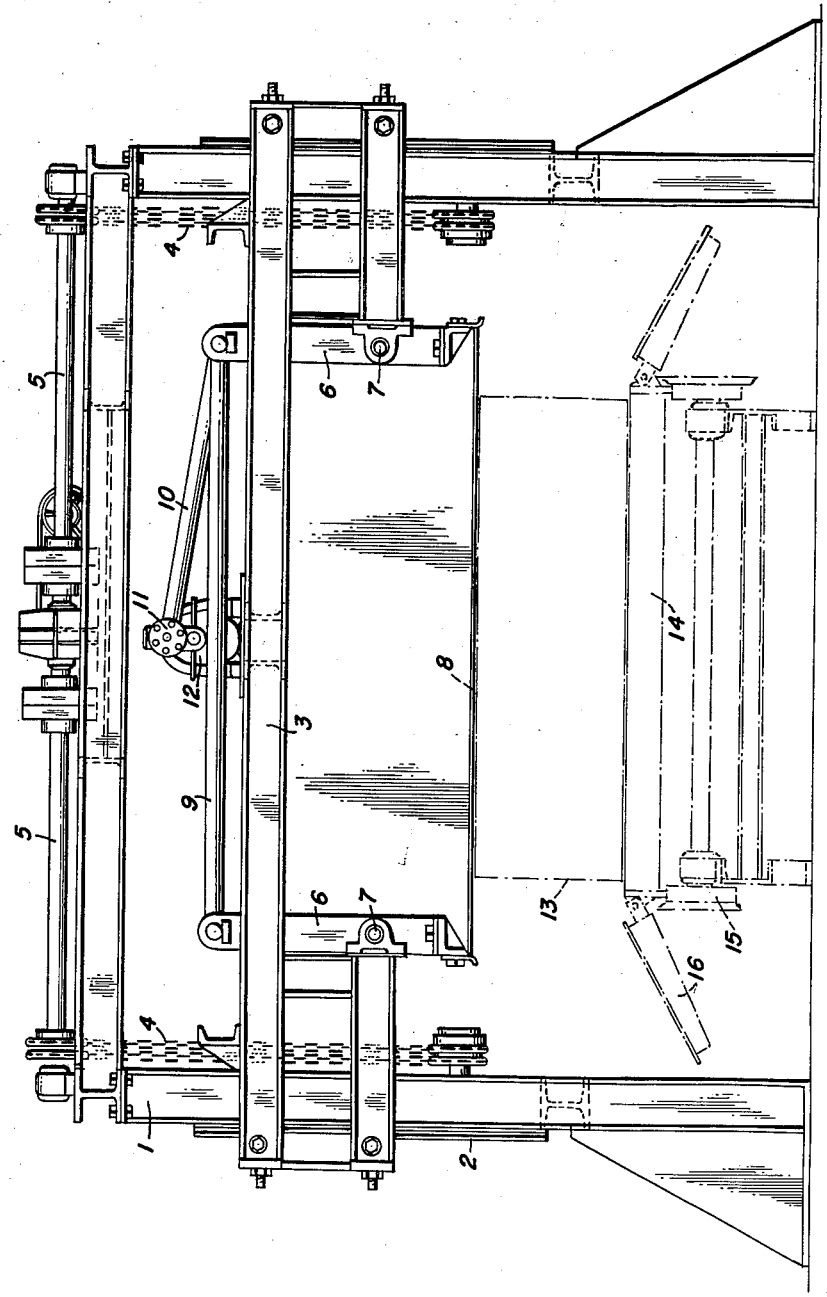

3,108,350
SAWING DEVICE
Karl Aldo Ludvig Bergling, Orebro, Sweden, assignor to Charles Gunnar Birger Bergling, Orebro, Sweden
Filed Apr. 17, 1961, Ser. No. 103,528
Claims priority, application Sweden Apr. 20, 1960
3 Claims. (Cl. 25—108)

This invention relates to a sawing device, particularly for sawing non-cured light-weight concrete and other plastic masses. The device of the invention will below be described with reference to a light-weight concrete saw, but it may, as a principle, be used for sawing other materials.

It is known to saw light-weight concrete with a saw member, for instance a wire, which is arranged in a tense position in a frame which is given a reciprocating movement. Such a frame must usually be very strong, because the light-weight blocks to be sawn are big, and because a plurality of saw members are arranged in one frame. Consequently, the frame will be heavy, and great forces are needed for giving the frame a reciprocating movement.

According to this invention, the weight of such moving parts to which the reciprocating movement must be imparted can be much reduced as compared to the prior devices. The device of the invention comprises a saw frame having at least one saw member, such as a wire or a saw blade, arranged therein in a stretched condition, and a driving means arranged to impart to the saw member a reciprocating movement, and is characterized in that the ends of the saw member are secured to holders which are movably secured to the saw frame, and that the driving means is connected to said holders so as to impart said reciprocating movement to the holders and the saw members, but not to the saw frame.

The invention will now be more closely described with reference to the accompanying drawing which illustrates an embodiment of a device for sawing light-weight concrete.

The illustrated device consists of a stationary stand 1 which is provided with guide members 2 giving an exact movement to a saw frame 3 which can be moved vertically. The saw frame is lifted and lowered by chains 4, actuated via shafts 5 by a motor, not shown. The saw frame has two saw arms 6, rotatably secured by pivots 7. Between the lower ends of the saw arms there is a stretched saw member 8, which consists in the illustrated embodiment of a wire suitable for sawing light-weight concrete. The upper ends of the saw arms are rotatably connected by a bar 9. One saw arm is rotatably connected to a rod 10, which is via an eccentric 11, actuated by an electric motor 12 supported by the saw frame.

As a matter of fact, but this is not evident from the drawing, it is convenient to arrange a plurality of saw members in one sawing device. Thus a light-weight concrete block can be divided into a plurality of smaller blocks in one sawing operation. In such a device there are preferably two or more pairs of saw arms 6, all arms being situated on one side of the block to be sawn being at their lower ends connected by a beam to which the saw members are secured.

The light-weight concrete block to be sawn is introduced into the device while still situated in the mould 14 in which it has been manufactured. In the illustrated embodiment the mould is transported on a roller way 15. The mould is secured in the desired position, the mould walls 16 are lowered, and the sawing device is started so that the saw frame 3 starts its downward movement and simultaneously the arms 6 and the saw members 8 are given a reciprocating sawing movement.

It has been found that the device of the invention cuts the light-weight concrete block down to the bottom of the mould, along the entire length of the saw member. This has been difficult to achieve by prior sawing devices containing wires as saw members. This useful effect is probably due to the fact that, owing to the rotary movement of the saw arms, the saw members are given not only a reciprocating sawing movement but also an up and down movement.

In the device of the invention the parts between which the saw members are stretched, i.e. the saw arms 6, may be of a comparatively slight or slender structure. The bar 9 may also be comparatively slender, as it has only to withstand pulling forces. The part which has to withstand the tension of the saw members is, in the illustrated case, the saw frame 3, which must consequently be comparatively strong. This is no greater inconvenience, as the saw frame is to be given a slow motion only, not a rapid, oscillating motion.

From what has been said above it is clear that it is an essential feature of the invention that the member, for instance the saw frame 3, which ultimately withstands the tension of the saw wire, does not accompany the saw wire in its rapid motion. On the contrary, the weight of such members as make such a rapid motion shall be reduced as far as possible. As stated above it is useful that the saw wire is given movements in two directions of the plane defining the saw cut. This can be achieved by devices different from that illustrated on the drawing. The actuating device may be, for instance, two wheels arranged to rotate synchronously and provided with eccentrically situated pivots, the saw wire being arranged between said pivots in a stretched position. Thus, every part of the saw wire will make a circular movement in the plane defined by the saw cut. The wheels are supported by a saw frame which can be given a feed movement corresponding to the desired sawing velocity.

What is claimed is:

1. A sawing device, particularly for sawing non-cured light-weight concrete, including a saw frame having at least one saw member, such as a wire or a saw blade, arranged therein in a stretched condition, and a driving means arranged to impart to the saw member a reciprocating movement, characterized in that the ends of the saw member are secured in stretched condition between confronting end portions of generally parallel arms pivotally connected to the saw frame, those ends of said arms which are remote from said saw member being pivotally interconnected by a rod generally parallel to said saw member, the pivotal connections of said arms to said saw frame being intermediate said ends of said arms, and means for rocking said arms about the pivotal connections of said arms to said saw frame, whereby the rocking of said arms about said pivotal connections in a generally vertical plane imparts a generally horizontally reciprocating movement to said saw member, resulting in a saw cut, and further characterized in that said saw frame is arranged to be movable in the direction of the saw cut.

2. A sawing device, particularly for sawing non-cured light-weight concrete, comprising a saw frame having at least one saw member, such as a wire or a saw blade, arranged therein in a stretched condition, and a driving means arranged to impart to the saw member a reciprocating movement, characterized in that the ends of the saw member are secured in stretched condition between confronting end portions of generally parallel arms pivotally connected to the saw frame, those ends of said arms which are remote from said saw member being pivotally interconnected by a rod generally parallel to said saw member and at least one of said remote arm ends being pivotally connected to said driving means, the pivotal connections of said arms to said saw frame being intermediate said ends of said arms, whereby the rocking of said arms about said pivot means in a generally vertical plane imparts a generally horizontally reciprocating movement to said saw member, resulting in a saw cut, and further characterized in that said saw frame is arranged to be movable in the direction of the saw cut.

3. A sawing device, as defined in claim 2, for sawing a light-weight concrete block in a vertical plane, characterized in that said saw frame is movable in a vertical plane.

References Cited in the file of this patent

UNITED STATES PATENTS

| | | |
|---|---|---|
| 455,540 | Camp | July 7, 1891 |
| 1,955,004 | Lodge | Apr. 17, 1934 |
| 2,754,772 | Anetsberger | July 17, 1956 |

FOREIGN PATENTS

| | | |
|---|---|---|
| 150,239 | Sweden | May 31, 1955 |
| 81,553 | Denmark | July 23, 1956 |